US011927328B2

(12) United States Patent
Liu

(10) Patent No.: US 11,927,328 B2
(45) Date of Patent: Mar. 12, 2024

(54) MULTIFUNCTIONAL LAMP MOUNTING BOX

(71) Applicant: SHENZHEN BOWEI OPTOELECTRONICS CO., LTD., Shenzhen (CN)

(72) Inventor: Ziang Liu, Shenzhen (CN)

( * ) Notice: Subject to any disclaimer, the term of this patent is extended or adjusted under 35 U.S.C. 154(b) by 0 days.

(21) Appl. No.: 17/523,808

(22) Filed: Nov. 10, 2021

(65) Prior Publication Data

US 2023/0110783 A1 Apr. 13, 2023

(30) Foreign Application Priority Data

Oct. 9, 2021 (CN) .......................... 202111176042.7

(51) Int. Cl.
*F21V 21/088* (2006.01)
*F21V 23/04* (2006.01)

(52) U.S. Cl.
CPC ............ *F21V 21/088* (2013.01); *F21V 23/04* (2013.01)

(58) Field of Classification Search
CPC .... F21V 17/002; F21V 21/008; F21V 21/005; F21V 21/03; F21V 21/10; F21V 21/104; F21S 8/026; F21S 8/04; F21S 8/043; F21S 8/06; F21S 8/061; F21S 8/063; F21S 8/068
See application file for complete search history.

(56) References Cited

U.S. PATENT DOCUMENTS 1,270,296 A * 6/1918 Jeune ...................... F21V 21/02
403/348
1,507,758 A * 9/1924 Scott ....................... F21V 21/03
362/404
1,529,822 A * 3/1925 Adam ....................... F21S 8/04
362/439
1,529,823 A * 3/1925 Adam ....................... F21S 8/06
362/429
1,627,461 A * 5/1927 Blackwell ............... F21V 21/02
362/437
1,754,929 A * 4/1930 Saltzman ................ F21V 21/14
362/396
1,816,292 A * 7/1931 Morey ...................... F21S 8/04
362/429
1,843,054 A * 1/1932 Weinstein ................ H02G 3/20
248/343
2,025,055 A * 12/1935 Hubbell, Jr. ........... H01H 17/00
362/394

(Continued)

FOREIGN PATENT DOCUMENTS

CN 200979101 Y * 11/2007 ............. F21S 8/061

OTHER PUBLICATIONS

Zhang, CN200979101Y, English (Year: 2007).*

*Primary Examiner* — Peggy A Neils
*Assistant Examiner* — James M Endo

(57) ABSTRACT

A multifunctional lamp mounting box includes a mounting plate defining a plurality of mounting holes; a connecting member, wherein one end of the connecting member is connected to the mounting holes, and the other end of the connecting member is connected to a mounting base; a housing, wherein an upper part of the housing is detachably connected to the mounting plate, and a lower part of the housing defines an accommodating cavity; and a lamp holder detachably mounted in the accommodating cavity and configured to connect a lamp.

15 Claims, 8 Drawing Sheets

(56) References Cited

U.S. PATENT DOCUMENTS

| | | | | | | |
|---|---|---|---|---|---|---|
| 2,264,951 | A * | 12/1941 | Naysmith | F21V 17/00 | 362/306 |
| 2,314,233 | A * | 3/1943 | Mcsween | F21S 8/06 | 362/217.08 |
| 2,319,621 | A * | 5/1943 | Mclaughlin | F21S 8/04 | 362/439 |
| 2,322,112 | A * | 6/1943 | Brooks | F21V 17/00 | 362/437 |
| 2,413,505 | A * | 12/1946 | Kilduff | F21V 17/00 | 362/225 |
| 2,723,344 | A * | 11/1955 | Greminger | F21V 21/03 | 362/439 |
| 3,012,132 | A * | 12/1961 | Rosenfield | F21S 8/06 | 248/343 |
| 3,258,239 | A * | 6/1966 | Green | F21V 17/02 | 362/311.06 |
| 3,589,660 | A * | 6/1971 | Dunckel | F21V 21/02 | 52/39 |
| 3,886,349 | A * | 5/1975 | Arai | F21V 5/008 | 362/306 |
| 4,199,803 | A * | 4/1980 | Hunt, III | F21V 21/03 | 362/147 |
| 4,418,379 | A * | 11/1983 | De Marsh | F21V 7/16 | 362/296.07 |
| 4,507,719 | A * | 3/1985 | Quiogue | F21V 29/15 | 362/147 |
| 4,645,286 | A * | 2/1987 | Isban | H02G 3/20 | 439/537 |
| 4,760,510 | A * | 7/1988 | Lahti | F21V 21/046 | 362/148 |
| 4,837,669 | A * | 6/1989 | Tharp | F21S 8/06 | 362/147 |
| 4,896,145 | A * | 1/1990 | Lewkowicz | G08B 17/00 | 340/693.11 |
| 4,999,748 | A * | 3/1991 | Aoshika | F21V 21/049 | 362/372 |
| 5,034,869 | A * | 7/1991 | Choi | F21V 21/02 | 362/453 |
| 5,090,653 | A * | 2/1992 | Theodorides | F21V 21/03 | 248/300 |
| 5,349,513 | A * | 9/1994 | Taylor, III | F21V 33/0096 | 362/147 |
| 5,491,618 | A * | 2/1996 | Vakil | F21V 21/02 | 362/147 |
| 5,526,244 | A * | 6/1996 | Bishop | F21V 23/02 | 362/147 |
| 5,568,969 | A * | 10/1996 | Yu | F21V 33/0096 | 362/147 |
| 5,628,418 | A * | 5/1997 | Deschamps | H02G 3/20 | 220/3.9 |
| 5,653,412 | A * | 8/1997 | Martorano | F21V 21/34 | 362/418 |
| 5,741,064 | A * | 4/1998 | Chin | F21V 27/00 | 362/363 |
| 5,797,721 | A * | 8/1998 | Yu | F21V 15/04 | 362/147 |
| 5,980,071 | A * | 11/1999 | Hsieh | F21V 21/02 | 362/249.11 |
| 6,099,144 | A * | 8/2000 | Klaus | H01R 33/0872 | 439/546 |
| 6,152,579 | A * | 11/2000 | Reed | F21V 7/10 | 362/346 |
| 6,210,019 | B1 * | 4/2001 | Weathers | F21V 19/008 | 362/225 |
| 6,293,510 | B1 * | 9/2001 | Bradford | F21V 17/107 | 248/342 |
| 6,623,138 | B1 * | 9/2003 | Hsu | F21V 21/03 | 362/147 |
| 6,653,558 | B1 * | 11/2003 | Bucher | F21V 21/03 | 174/67 |
| 6,872,054 | B2 * | 3/2005 | Pearce | F04D 29/601 | 416/246 |
| 6,877,703 | B2 * | 4/2005 | Tang | F04D 25/088 | 248/220.22 |
| 7,105,744 | B1 * | 9/2006 | Kwong | H02G 3/20 | 174/58 |
| 7,249,744 | B2 * | 7/2007 | Bacon | F04D 29/601 | 248/343 |
| 7,287,883 | B1 * | 10/2007 | Plunk | F21V 21/112 | 362/148 |
| 7,300,248 | B2 * | 11/2007 | Wang | F04D 25/088 | 248/343 |
| 7,540,461 | B2 * | 6/2009 | Liang | F04D 29/646 | 403/322.2 |
| 7,712,949 | B2 * | 5/2010 | Tufano | F21V 21/02 | 362/652 |
| 7,954,976 | B1 * | 6/2011 | Berge | F21V 21/00 | 362/148 |
| 8,418,981 | B1 * | 4/2013 | Lowe | F04D 29/601 | 248/342 |
| 9,702,533 | B1 * | 7/2017 | Harpenau | F21V 21/03 | |
| 10,168,029 | B1 * | 1/2019 | Hsu | F21S 8/043 | |
| 10,309,629 | B2 * | 6/2019 | Liang | F21V 21/14 | |
| 10,533,716 | B2 * | 1/2020 | Moon | G02B 6/0088 | |
| 10,612,756 | B1 * | 4/2020 | Hsu | F21V 21/03 | |
| 10,731,830 | B2 * | 8/2020 | Feit | F21V 21/04 | |
| 10,816,150 | B1 * | 10/2020 | Hsu | F21S 8/043 | |
| 11,025,041 | B2 * | 6/2021 | Thomas | F04D 29/601 | |
| 11,029,005 | B1 * | 6/2021 | Hsu | F21V 21/03 | |
| 2002/0071284 | A1 * | 6/2002 | Fischer | F21V 17/164 | 362/453 |
| 2002/0111063 | A1 * | 8/2002 | Kerr | F04D 25/088 | 439/545 |
| 2002/0118545 | A1 * | 8/2002 | Bucher | F21V 21/03 | 362/404 |
| 2002/0197910 | A1 * | 12/2002 | Kerr, Jr. | H02G 3/20 | 439/537 |
| 2003/0062460 | A1 * | 4/2003 | Facey | F16G 11/14 | 248/328 |
| 2003/0082948 | A1 * | 5/2003 | Hakkarainen | F21S 8/06 | 439/531 |
| 2003/0161149 | A1 * | 8/2003 | Eaton, Jr. | F21S 8/04 | 362/373 |
| 2003/0189151 | A1 * | 10/2003 | Hsing | F04D 29/601 | 248/345 |
| 2004/0095752 | A1 * | 5/2004 | Hsu | F21S 8/04 | 362/147 |
| 2004/0109322 | A1 * | 6/2004 | Desanto | F21V 17/02 | 362/372 |
| 2004/0218393 | A1 * | 11/2004 | Brondt | F21V 21/112 | 362/225 |
| 2004/0240213 | A1 * | 12/2004 | Sergio | F21S 8/04 | 362/368 |
| 2004/0246729 | A1 * | 12/2004 | Wu | F21V 21/02 | 362/406 |
| 2005/0047150 | A1 * | 3/2005 | Hsieh | F21V 17/007 | 362/404 |
| 2006/0221621 | A1 * | 10/2006 | Ruben | F21V 29/83 | 362/368 |
| 2006/0285357 | A1 * | 12/2006 | Shyu | F21V 23/04 | 362/611 |
| 2007/0183138 | A1 * | 8/2007 | Cooper | F21V 21/03 | 362/453 |
| 2007/0246631 | A1 * | 10/2007 | Brown | F21V 21/112 | 248/343 |
| 2008/0259597 | A1 * | 10/2008 | Safford | F21V 23/0442 | 362/231 |
| 2009/0321598 | A1 * | 12/2009 | Vann | F21V 21/02 | 248/227.1 |
| 2012/0140493 | A1 * | 6/2012 | Tarr | H02G 3/20 | 362/404 |
| 2012/0266449 | A1 * | 10/2012 | Krupa | F21V 19/00 | 29/592.1 |
| 2013/0016504 | A1 * | 1/2013 | Garber | F21V 21/02 | 29/418 |
| 2013/0039079 | A1 * | 2/2013 | Lutzke | F21S 8/061 | 362/396 |

(56) References Cited

U.S. PATENT DOCUMENTS

| | | | | |
|---|---|---|---|---|
| 2013/0058087 | A1* | 3/2013 | Chang | F21S 8/04 362/249.02 |
| 2013/0077322 | A1* | 3/2013 | Botkin | F21V 17/002 362/355 |
| 2013/0094230 | A1* | 4/2013 | Verfuerth | F21V 21/112 362/396 |
| 2013/0258660 | A1* | 10/2013 | Kim | F21V 21/00 362/235 |
| 2013/0272019 | A1* | 10/2013 | Engstrom | F21V 21/04 362/382 |
| 2013/0292149 | A1* | 11/2013 | Cooper | H02G 3/18 174/44 |
| 2014/0268825 | A1* | 9/2014 | Lay | F21V 21/03 362/371 |
| 2014/0301076 | A1* | 10/2014 | Ter-Hovhannisyan | F21V 5/04 362/249.02 |
| 2014/0347848 | A1* | 11/2014 | Pisavadia | F21K 9/20 362/190 |
| 2014/0355302 | A1* | 12/2014 | Wilcox | F21V 23/0464 362/609 |
| 2015/0276197 | A1* | 10/2015 | Horng | F21V 1/00 362/294 |
| 2015/0316238 | A1* | 11/2015 | Guilmette | F21V 7/24 362/217.05 |
| 2015/0338071 | A1* | 11/2015 | Feit | F21S 8/02 362/370 |
| 2016/0010835 | A1* | 1/2016 | Lee | F21S 8/00 362/147 |
| 2016/0131346 | A1* | 5/2016 | Creasman | G08G 1/095 248/220.21 |
| 2016/0195669 | A1* | 7/2016 | Boulanger | F21S 8/04 362/249.02 |
| 2016/0209009 | A1* | 7/2016 | Yang | F21V 21/104 |
| 2016/0273743 | A1* | 9/2016 | Spitzer | F21V 21/03 |
| 2017/0009962 | A1* | 1/2017 | Feit | F21S 8/043 |
| 2017/0159899 | A1* | 6/2017 | Liu | F21S 8/043 |
| 2017/0292684 | A1* | 10/2017 | Xiang | F21V 17/02 |
| 2017/0307154 | A1* | 10/2017 | Duckworth | F21V 23/008 |
| 2018/0031212 | A1* | 2/2018 | Nguyen | F21V 21/03 |
| 2018/0119934 | A1* | 5/2018 | Schneider | F21S 8/061 |
| 2018/0202637 | A1* | 7/2018 | Sieczkowski | F21S 8/036 |
| 2018/0320817 | A1* | 11/2018 | Zamora | F16M 13/027 |
| 2019/0049081 | A1* | 2/2019 | Chen | F21V 19/003 |
| 2019/0093875 | A1* | 3/2019 | Ter-Hovhannisyan | F21S 8/061 |
| 2019/0145590 | A1* | 5/2019 | Brothwell | H02G 3/20 362/147 |
| 2019/0323691 | A1* | 10/2019 | Winters | F21V 23/006 |
| 2020/0080709 | A1* | 3/2020 | Boulanger | F21V 21/04 |
| 2021/0010660 | A1* | 1/2021 | Hsu | F21S 8/04 |
| 2021/0140612 | A1* | 5/2021 | Moon | F21V 21/02 |
| 2021/0156533 | A1* | 5/2021 | Bai | F21V 21/047 |
| 2022/0113009 | A1* | 4/2022 | Liu | F21V 21/03 |

* cited by examiner

MULTIFUNCTIONAL LAMP MOUNTING BOX

CROSS-REFERENCE TO RELATED APPLICATIONS

This application claims priority to CHINESE patent application number CN202111176042.7, which was filed on Oct. 9, 2021, which is incorporated herein by reference in its entirety, and the priority benefits of which are hereby claimed.

FIELD OF THE INVENTION

The subject matter herein generally relates to lighting devices, and more particularly to a multifunctional lamp mounting box.

BACKGROUND OF THE INVENTION

Since the invention of electric lamps, lamps have played an important role in people's daily life. However, people often encounter various problems in connection with the installation and use of the lamps. For example, it is inconvenient to install the lamps. Therefore, people usually use lamp mounting boxes to conveniently install the lamps.

Generally, a mounting box and a lamp are connected together. A structure of the lamp mounting box determines an installation mode of the lamp. However, a function of an existing lamp mounting box is relatively simple. It can allow the lamp to be mounted by only one of connection modes of ceiling installation, wall installation, hanging installation, hoisting installation, and pole installation, which greatly limits user's selection and use. Moreover, when replacing lamps, it is also necessary to select lamps whose type and size suitable for the lamp mounting box, which further limits user's choices. People can only choose a complete set of a lamp and a lamp mounting box. When changing a lamp installation mode, the lamp mounting box needs to be replaced, which not only causes great inconvenience to users, but also wastes resources.

Therefore, there is a desire for a multifunctional lamp mounting box, which can be used in multiple installation modes and can be used together with various lamps. It is convenient for users to mount lamps, allow users to select lamps and installation modes freely, and convenient to use.

SUMMARY OF THE INVENTION

In order to solve above problems, the present disclosure provides a multifunctional lamp mounting box which is simple in structure and is convenient to use.

A lamp mounting box includes a multifunctional lamp mounting box includes a mounting plate defining a plurality of mounting holes; a connecting member, wherein one end of the connecting member is connected to the mounting holes, and the other end of the connecting member is connected to a mounting base; a housing, wherein an upper part of the housing is detachably connected to the mounting plate, and a lower part of the housing defines an accommodating cavity; and a lamp holder detachably mounted in the accommodating cavity and configured to connect a lamp.

In at least one embodiment, the multifunctional lamp mounting box further includes at least one fixing screw. The housing defines at least one first through hole, the mounting plate is provided with at least one screw hole corresponding to the at least one first through hole, the fixing screw passes through the first through hole to be threaded to the screw hole.

In at least one embodiment, the lamp hole is in a cylindrical shape, the lamp holder is provided with an inner thread and an electrical contact, the inner thread is configured to connect the lamp, and the electrical contact is configured to electrically connect an electrical contact of the lamp.

In at least one embodiment, the multifunctional lamp mounting box further includes a power line. The mounting hole includes a first mounting hole, a zero terminal at a first end of the power line is connected to the inner thread, and a live terminal at the first end of the power line is electrically connected to the electrical contact of the lamp holder, and a second end of the power line passes through the first mounting hole to be connected to a main supply.

In at least one embodiment, the first mounting hole is arranged at a center of the mounting plate.

In at least one embodiment, the connecting member is a hook, the hook is provided with a first thread at a bottom thereof, the first thread is threaded to the first mounting hole.

In at least one embodiment, the hook is provided with a locking screw, the locking screw defines a thread hole, the locking screw can be engaged with the thread hole to define locking space.

In at least one embodiment, the connecting member is a mounting tube, the mounting tube is provided with a second thread at a bottom thereof, the second thread is threaded to the first mounting hole.

In at least one embodiment, the mounting tube comprises a first fixing nut and a second fixing nut, the first fixing nut is threaded to a lower part of the second thread, and the second fixing nut is threaded to an upper part of the second thread, the first fixing nut resists against a lower surface of the mounting plate, and the second fixing nut resists against an upper surface of the mounting plate.

In at least one embodiment, the connecting member is at least one connecting screw, the mounting hole comprises at least one second mounting hole, a threaded part of the connecting screw passes through the second mounting hole to connect with the mounting base, and a head of the connecting screw resists against the lower surface of the mounting plate.

In at least one embodiment, the number of the at least one connecting screw is at least two, the number of the at least one second mounting hole is at least two, at least two of the second mounting hole is evenly distributed on the mounting plate.

In at least one embodiment, the connecting member is a suspending element, the mounting hole further comprises two third mounting holes symmetrically arranged on the mounting plate, two opposite ends of the suspending element are threaded to the two third mounting holes respectively, the suspending element is configured to hang the multifunctional lamp mounting box onto the mounting base.

In at least one embodiment, the suspending element is an iron chain or a rope.

In at least one embodiment, the multifunctional lamp mounting box further comprises a pull switch. The pull switch is arranged on the housing and extends out of the housing, the pull switch is electrically connected to the power line and configured to switch on/off a circuit of the lamp.

With the multifunctional lamp mounting box of the present disclosure, when being used to mount a lamp, users can select a suitable connecting member, such as suspending elements, hooks, or connecting screws to mount the mounting plate to the mounting base. The mounting base can be, but is not limited to, a wall, a ceiling, a mounting pole, a mounting ring, or a mounting hook. Then the housing is mounted to the mounting plate, and then a suitable lamp holder corresponding to the lamp is selected to be mounted in the mounting cavity. Finally, the lamp is mounted to the lamp holder. The multifunctional lamp mounting box can be used in various mounting base. Furthermore, the multifunctional lamp mounting box allow users to select various lamps, which provides users with diversified choices to meet user's requirements.

BRIEF DESCRIPTIONS OF THE DRAWINGS

Implementations of the present disclosure will now be described, by way of embodiment, with reference to the attached figures. It should be understood that the drawings are shown for illustrative purpose only, for the ordinary person skilled in the art, other drawings obtained from these drawings without paying creative labor by an ordinary person skilled in the art should be within scope of the present disclosure, and wherein the drawing figures are:

DETAILED DESCRIPTION OF THE ILLUSTRATED EMBODIMENT

Figure 1:
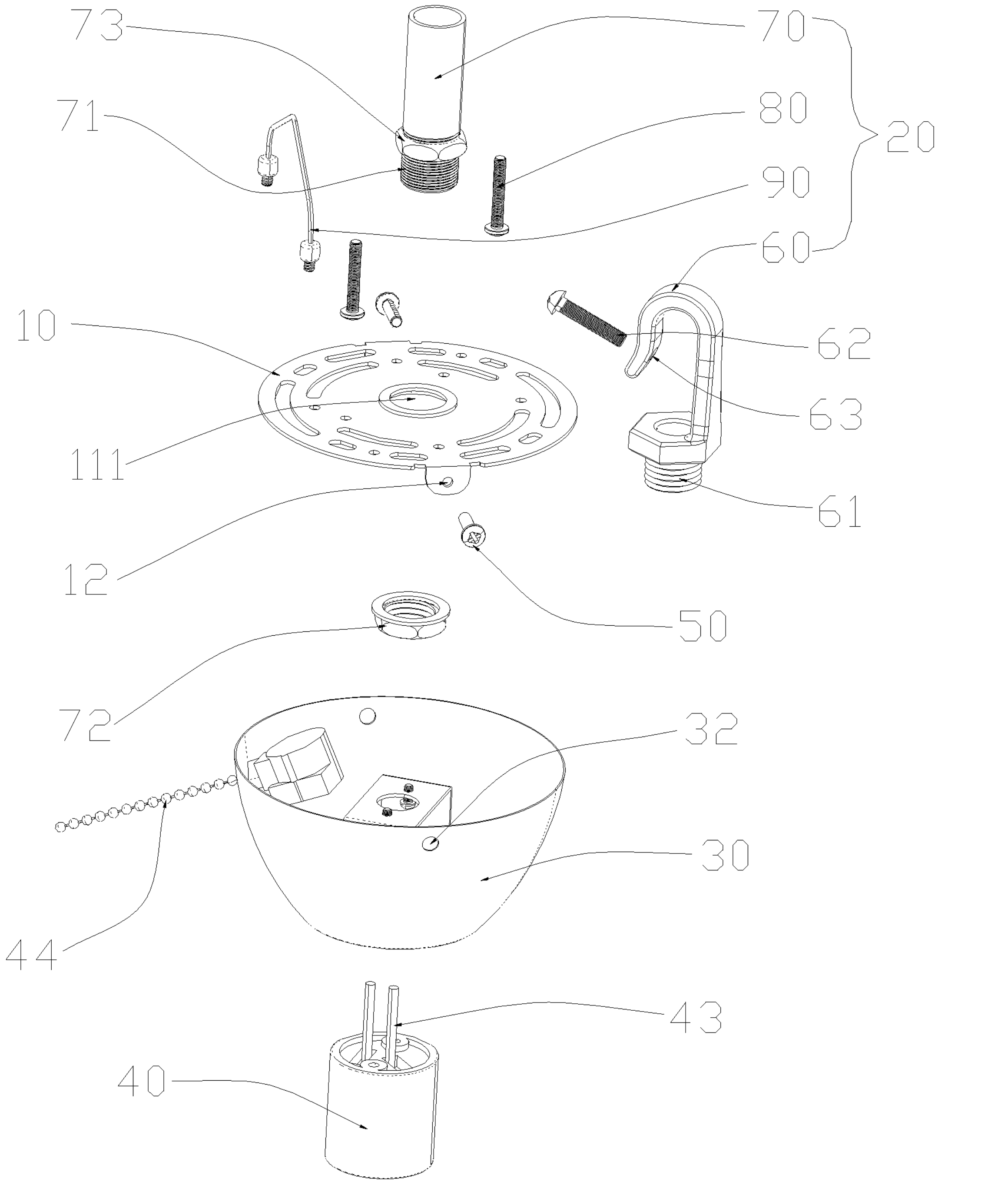
FIG. 1 is an exploded view of a multifunctional lamp mounting box according to an embodiment of the present disclosure, the lamp mounting box including a mounting plate.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the invention, "a plurality of" means two or more, unless otherwise specifically defined.

Figure 2:
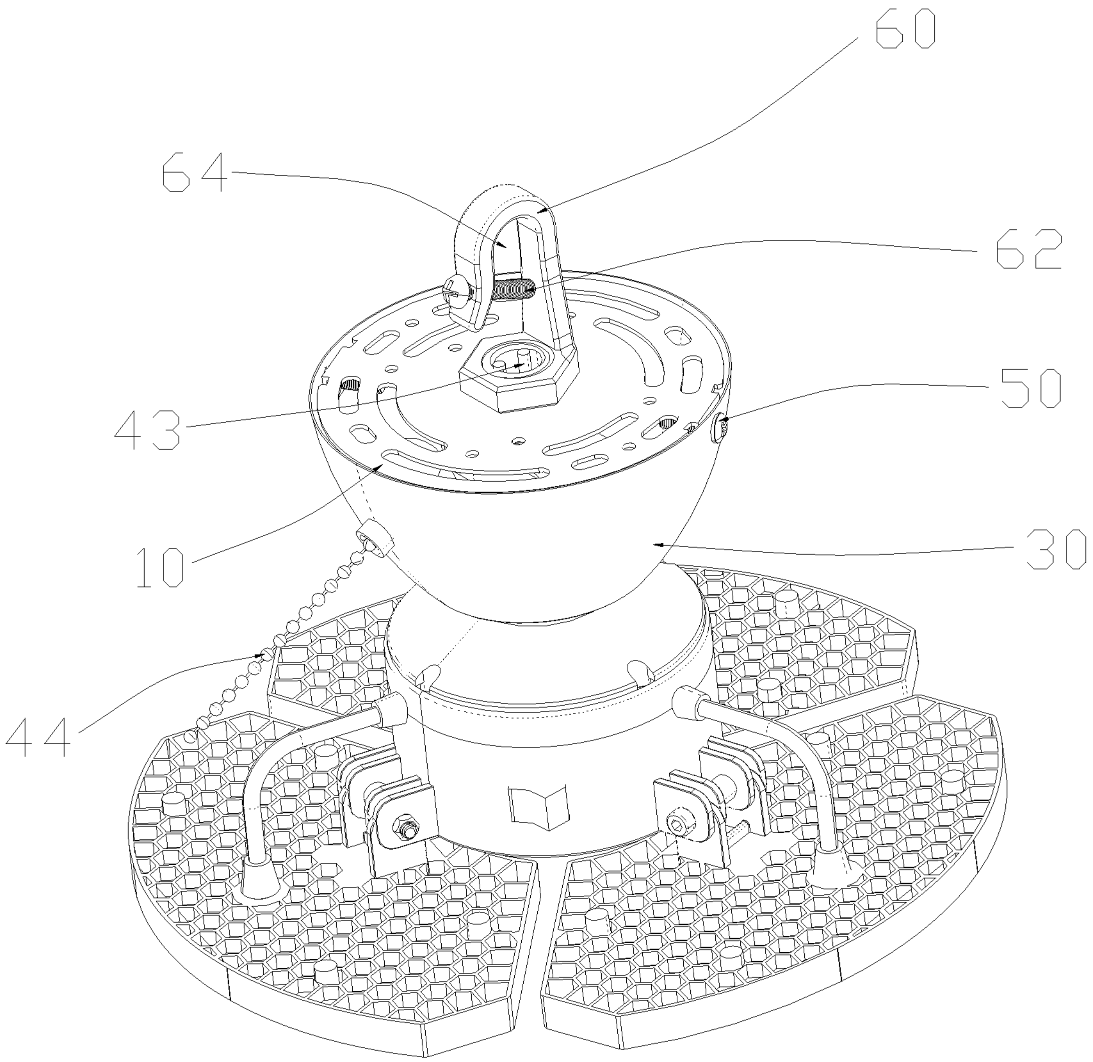
FIG. 2 is a schematic view of a multifunctional lamp mounting box according to a first embodiment of the present disclosure.
Figure 3:
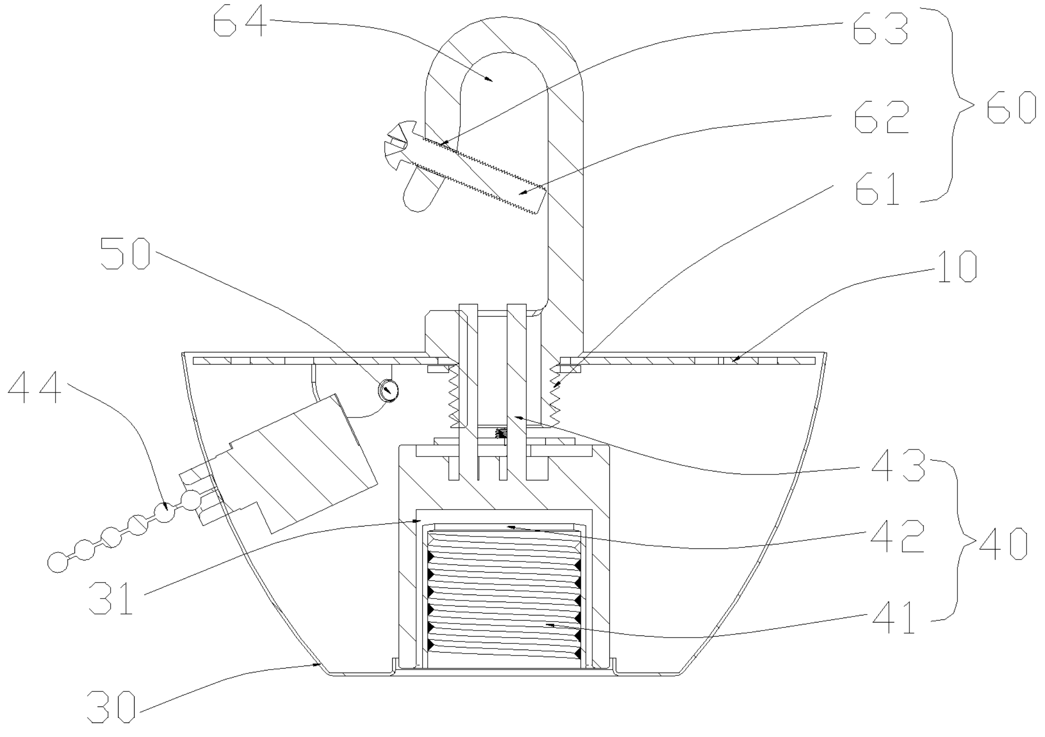
FIG. 3 is a cross-sectional view of the multifunctional lamp mounting box according to the first embodiment of the present disclosure.
Figure 4:
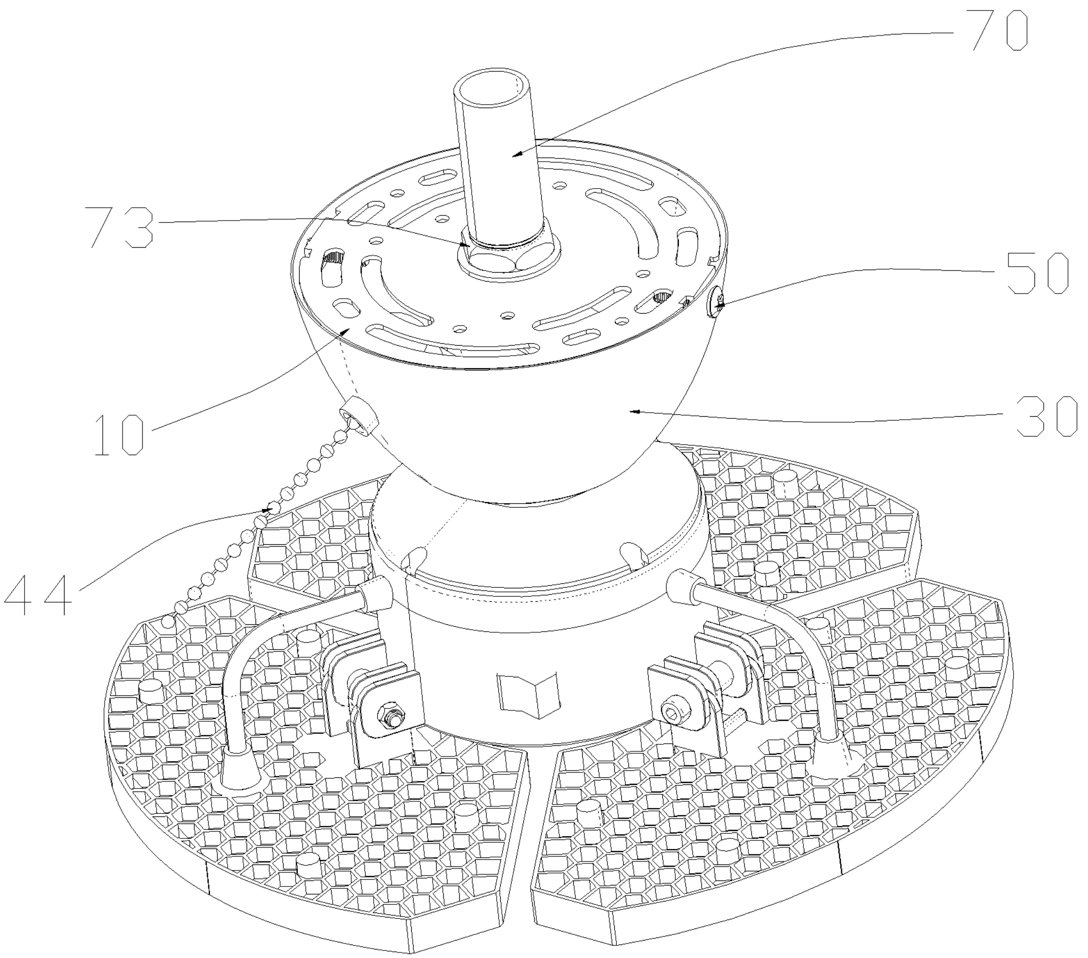
FIG. 4 is a schematic view of a multifunctional lamp mounting box according to a second embodiment of the present disclosure.
Figure 5:
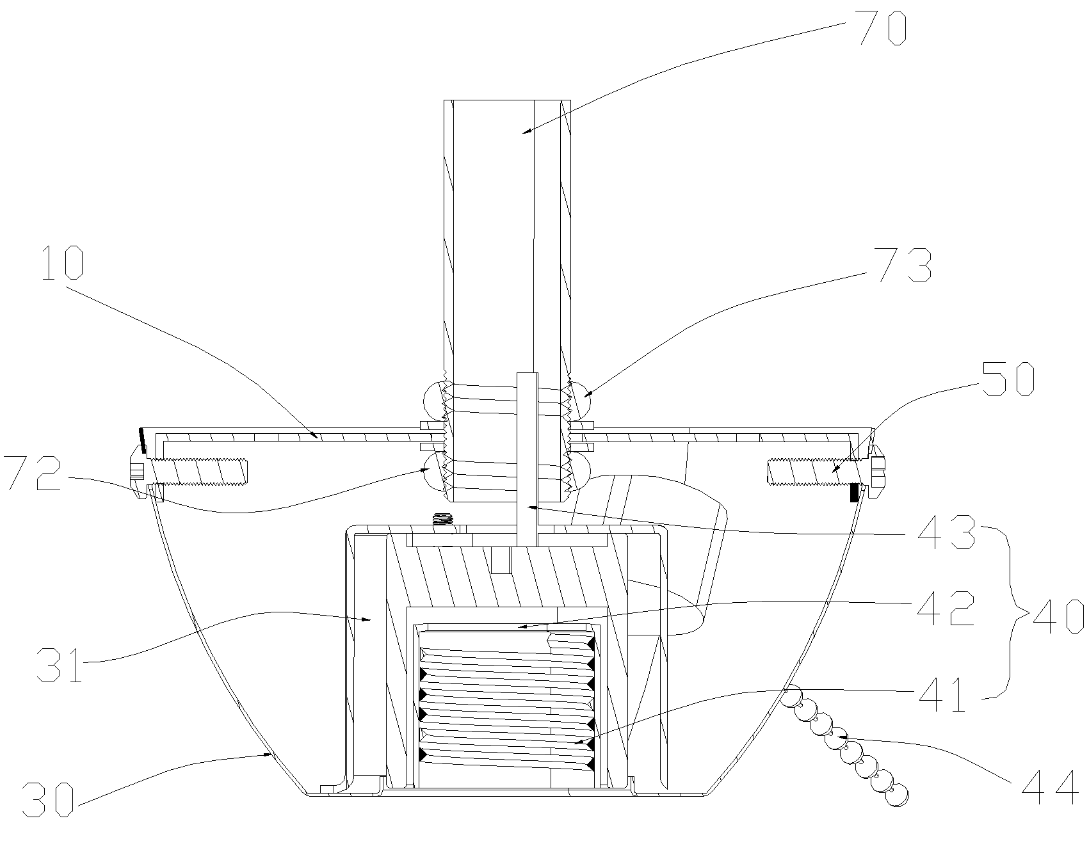
FIG. 5 is a cross-sectional view of the multifunctional lamp mounting box according to the second embodiment of the present disclosure.
Figure 6:
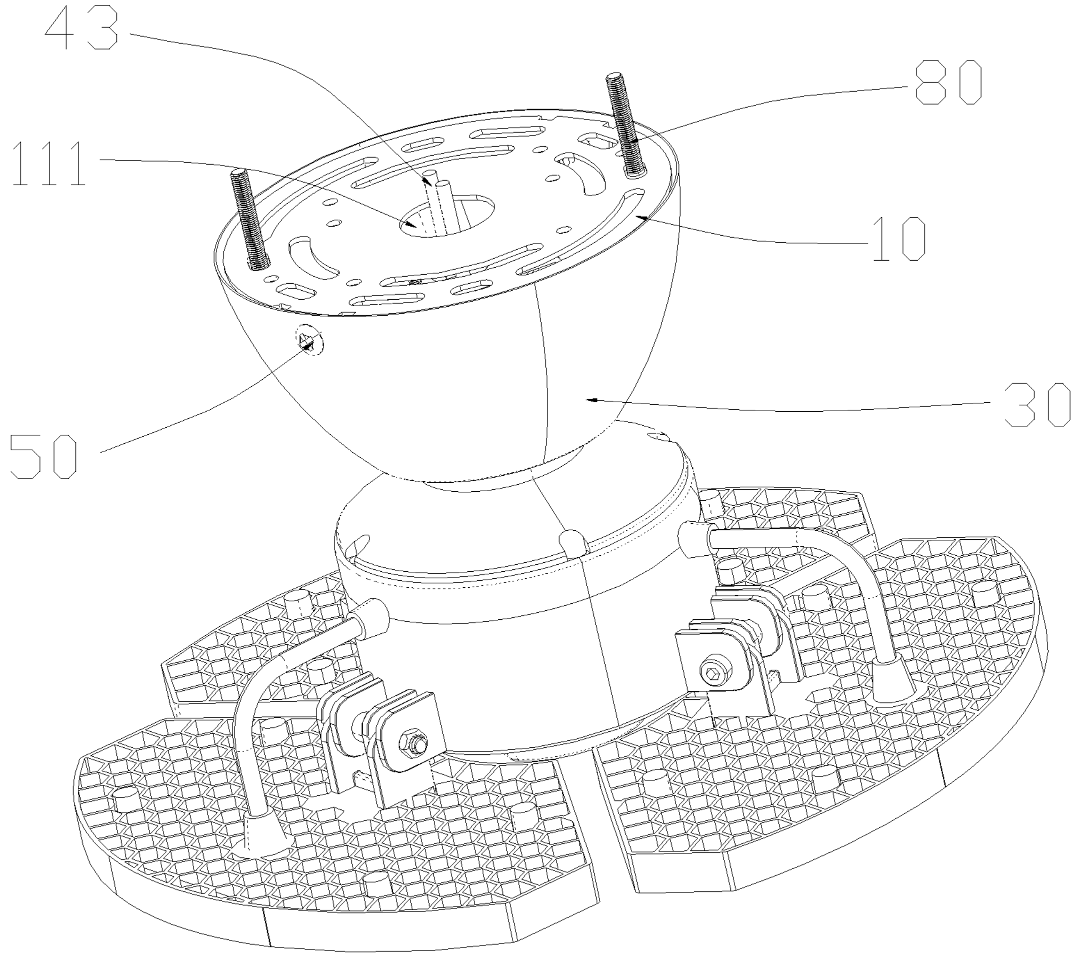
FIG. 6 is a schematic view of a multifunctional lamp mounting box according to a third embodiment of the present disclosure.
Figure 7:
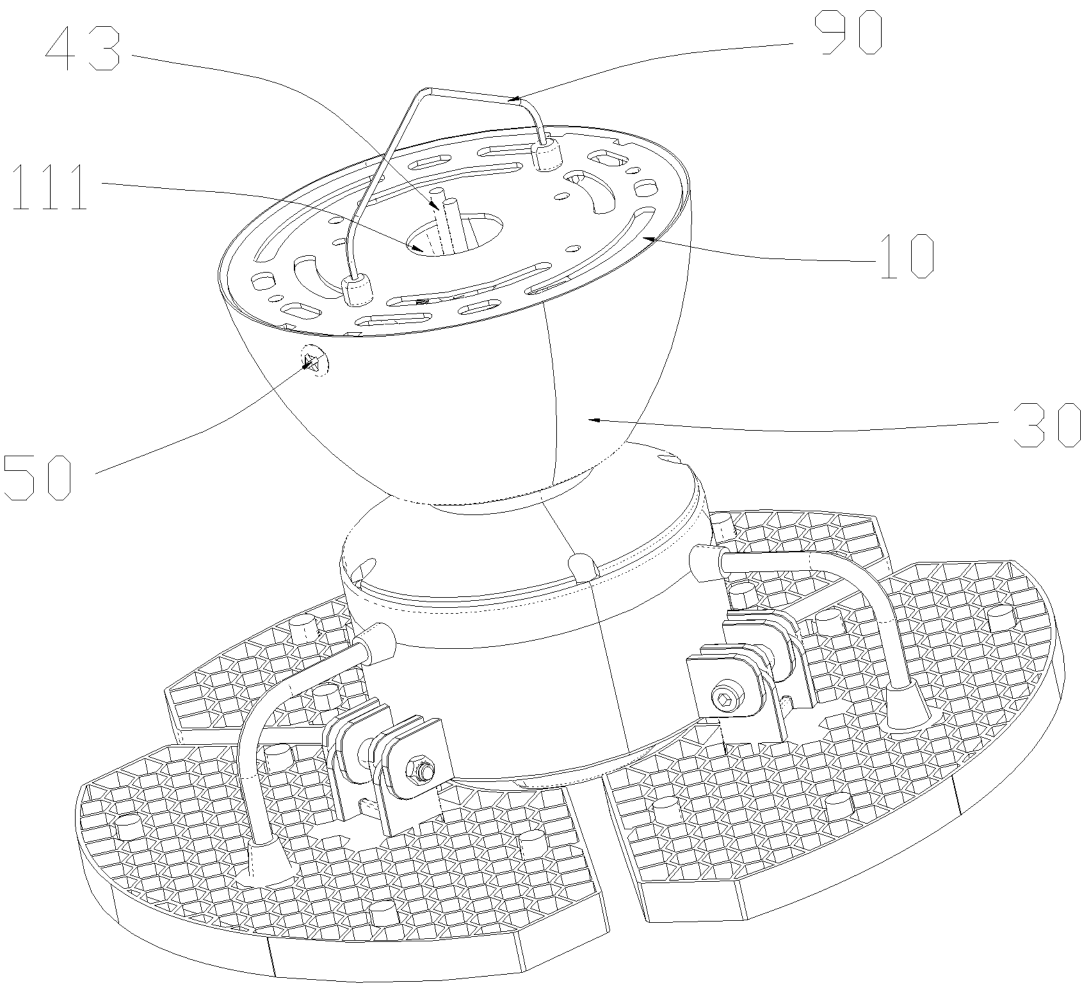
FIG. 7 is a schematic view of the multifunctional lamp mounting box according to a fourth embodiment of the present disclosure.
Figure 8:
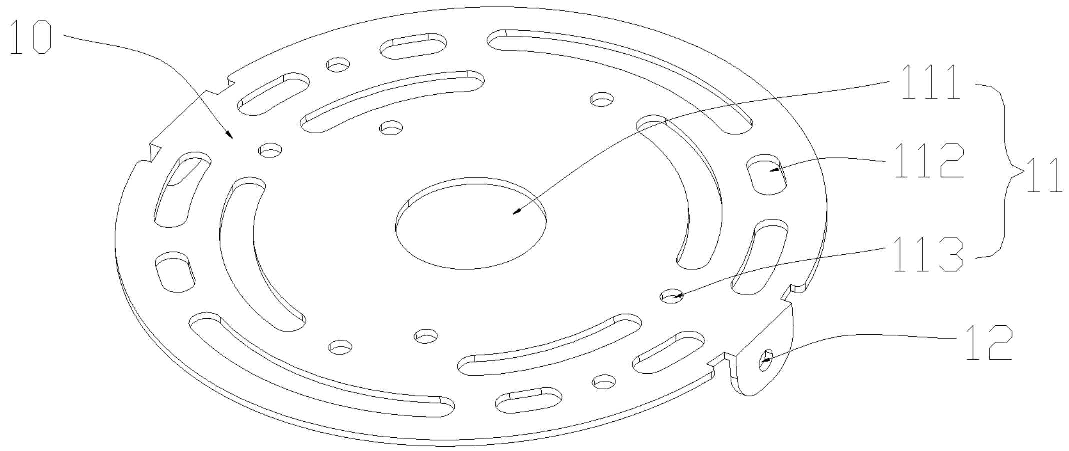
FIG. 8 is a schematic view of the mounting plate.

Referring to FIGS. 1-8, a multifunctional lamp mounting box provided by an embodiment of the present disclosure, includes a mounting plate 10 defining a plurality of mounting holes 11 thereon, a connecting member 20, a housing 30, and a lamp holder 40. One end of the connecting member 20 is connected with the mounting holes 11, and the other end of the connecting member 20 is configured to be connect to a mounting base. The housing 30 is detachably connected with the mounting plate 10. The housing 30 defines an accommodating cavity 31. The lamp holder 40 is detachably mounted in the accommodating cavity 31 and configured to connect a lamp.

Through the above arrangements, when mounting a lamp, users can select a suitable connecting member, such as suspending elements, hooks, or connecting screws to mount the mounting plate to the mounting base. The mounting base can be, but not limited to, a wall, a ceiling, a mounting pole, a mounting ring, or a mounting hook. Then the housing is mounted to the mounting plate. And then a suitable lamp holder corresponding to the lamp is selected to be mounted in the mounting cavity. Finally, the lamp is mounted to the lamp holder. The multifunctional lamp mounting box can be used in various mounting base. Furthermore, the multifunctional lamp mounting box allow users to select various lamps, which provides users with diversified choices to meet user's requirements.

In at least one embodiment, the multifunctional lamp mounting box further includes at least one fixing screw 50. The housing 30 defines at least one first through hole 32, and the mounting plate 10 is provided with at least one screw hole 12 corresponding to the at least one fixing screw 50. The fixing screw 50 can pass through the first through hole 32 and is screwed with the screw hole 12. Through such arrangement, the housing 30 and the mounting plate 10 can be connected together by the fixing screws 50, which is convenient and easy to mount. When in use, the mounting plate can be mounted to the mounting base by the connecting members. Since the mounting plate is separated from the housing, it is convenient for users to operate and simplifies mounting.

In at least one embodiment, the lamp holder 40 is in a cylindrical shape and is provided with an inner thread 41 and electrical contacts 42. The inner thread 41 is configured to cooperate with an outer thread of a lamp, and the electrical contacts 42 are configured to be electrically connected to electrical contacts of the lamp. Through such arrangements, cylindrical shape is more convenient for users to mount the lamp holder in the accommodating cavity 31. The lamp holder can be inserted into the holding slot without adjusting a direction of the lamp holder. The inner thread of the lamp holder can effectively achieve a stable connection with the lamp, and the electrical contacts of the lamp holder can effectively achieve an electrical connection with the lamp. Different types of lamp holders have internal threads in different sizes, such as E14, E26 and E40 lamp holders. Users can select an appropriate lamp holder according to a size of the lamp to realize installation and use of various lamps, which can improve user's use experience, reduce waste of resources and protect the environment.

In at least one embodiment, the multifunctional lamp mounting box further includes a power line 43. The mounting holes 11 include a first mounting hole 111. The power line 43 includes a first end and a second end away from the first end. The first end includes a zero terminal and a live terminal. The zero terminal is connected to the inner thread 41, and the live terminal is electrically connected to the electrical contact 42. The second end of the power line 43 extends through the first mounting hole 111 to be connected with the main supply. Through such arrangements, the second terminal of the power line 43 can pass through the first mounting hole, which is convenient to connect the Mains supply to obtain electric power. The first end of the power line is connected to the lamp holder, which is convenient to connect the lamp with the main supply. Appropriate power line can be used with the lamp holder according to a power of the lamp. For example, a power line with a greater diameter is selected to use with the lamp with a greater power, and a power line with a less diameter is selected to use with the lamp with a less power, thereby protect user's safety. In at least one embodiment, the first mounting hole 111 is arranged in a center of the mounting plate. The power line 43 passes through the first mounting hole, which helps to balance a gravity of the mounting box. Furthermore, the power line 43 passes through the first mounting hole, which allows the power line to be hidden by other components, thereby making the mounting box more beautiful and stable in structure.

In at least one embodiment, the connecting member 20 can be a hook 60. The hook 60 is provided with a first thread 61 at a bottom thereof. The first thread 61 is connected to the first mounting hole 111. Through such arrangements, when in use, the hook 60 can be connected with the mounting plate through the first thread 61, and the mounting plate 10 can be mounted to the mounting base through the hook. Therefore, the lamp can be hung onto the mounting base.

In at least one embodiment, the hook 60 is provided with a locking screw 62. The locking screw 62 defines a thread hole 63. The locking screw 62 can be engaged with the thread hole 63 to define locking space 64. Through such arrangements, the locking screw 62 together with the hook 60 to define the locking space 64, which can prevent the hook from falling off the mounting base, thereby improve stability of the multifunctional lamp mounting box. Furthermore, the locking screw is easy to assemble/disassemble, which is easy for users to mount/dismount the multifunctional lamp mounting box. It can greatly improve practicability of the multifunctional lamp mounting box and user's experience.

In at least one embodiment, the connecting member 20 can be a mounting tube 70. The mounting tube 70 is provided with a second thread 71 at a bottom thereof. The second thread 71 is connected to the first mounting hole 111. Through such arrangements, users can select the pole mounting mode to mount the multifunctional lamp mounting box, which is convenient and easy to mount. The second thread 71 is threaded to the first mounting hole 111, which is easy to mount/dismount. Furthermore, the first mounting hole is arranged at the center of the mounting plate, which helps to balance the gravity of the multifunctional lamp mounting box, thereby improving stability of the multifunctional lamp mounting box.

In at least one embodiment, the mounting tube 70 further includes a first fixing nut 72 and a second fixing nut 73. The first fixing nut 72 is threaded to a lower part of the second thread 71, and the second fixing nut 73 is threaded to an upper part of the second thread 71. The first fixing nut 72 resists against a lower surface of the mounting plate, and the second fixing nut 73 resists against an upper surface of the mounting plate. Through such arrangements, the first fixing nut and the second fixing nut are threaded to the second thread, and resist against two opposite surfaces of the mounting plate respectively, which further improve stability of the multifunctional lamp mounting box. It can prevent the multifunctional lamp mounting box from shifting to ensure a connection between the mounting tube 70 and the mounting plate more stable.

In at least one embodiment, the connecting member 20 can be at least one connecting screw 80. The mounting hole 11 can include at least one second mounting hole 112. A threaded part of the connecting screw 80 passes through the second mounting hole 112 to connect with the mounting base, and a head of the connecting screw 80 resists against the lower surface of the mounting plate 10. Through such arrangements, when in use, the connecting screw passes through the second mounting hole to be threaded to the mounting base, which is easy to mount the multifunctional lamp mounting box and stable in structure. Perfectly, two second mounting holes can be symmetrically arranged on the mounting plate, which can further balance gravity to ensure stability of the multifunctional lamp mounting box. Furthermore, the number of the connecting screws is more than two, such as three, four or more. More than two connecting screws are evenly distributed on the mounting plate to balance gravity to ensure stability of the multifunctional lamp mounting box. Each connecting screw is stressed evenly.

In at least one embodiment, the connecting member 20 can be a suspending element 90. The mounting hole 11 further includes third mounting holes symmetrically arranged. Two opposite ends of the suspending elements 90 are threaded to the third mounting holes 113. The suspending element 90 is configured to hang the multifunctional lamp mounting box onto the mounting base. Through such arrangement, the suspending element is threaded to the third mounting hole, which is easy and convenient to mount/dismount the suspending element. The third mounting holes are symmetrically arranged, which helps to balance gravity to ensure stability of the multifunctional lamp mounting box. Therefore, it allows users to select suspending installation mode to mount the lamp onto a ceiling. In at least one embodiment, the suspending element can be iron chain or a rope. The suspending element can be easily hung onto a pole or a hook, which is convenient for mounting the lamp.

In at least one embodiment, the multifunctional lamp mounting box further includes a pull switch 44. The pull switch 44 is arranged on the housing 30 and extends out of the housing 30. The pull switch 44 is electrically connected to the power line 43 and configured to switch on/off a circuit of the lamp. Through such arrangement, the pull switch 44 allows users to easily switch on/off the circuit so as to light on/off the lamp. It is easy for users to control the lamp, which provides convenience to the users.

The above description only describes embodiments of the present disclosure, and is not intended to limit the present disclosure, various modifications and changes can be made to the present disclosure. Any modifications, equivalent substitutions, improvements, or the like, made within the spirit and scope of the present disclosure are intended to be included within the scope of the present disclosure.

What is claimed and desired to be protected by Letters Patent is:

1. A multifunctional lamp mounting box, comprising:

a mounting plate, defining a plurality of mounting holes;

at least two connecting members configured to mount the lamp mounting box onto a mounting base in at least two different ways, wherein one end of each connecting member is connected to the mounting holes, and another end of the connecting member is connected to the mounting base; wherein the plurality of mounting holes comprises a first mounting hole, wherein the first mounting hole is arranged at a center of the mounting plate, the at least two connecting members comprise at least two of a hook, a mounting tube, at least one connecting screw and a suspending element, wherein the hook is provided with a first thread at a bottom thereof, the first thread is configured to be capable of being threaded to the first mounting hole; the mounting tube is provided with a second thread at a bottom thereof, the second thread configured to be capable of being threaded to the first mounting hole; the plurality of mounting holes comprise at least one second mounting hole, a threaded part of the at least one connecting screw passes through the at least one second mounting hole to connect with the mounting base, and a head of the at least one connecting screw resists against the lower surface of the mounting plate; the the plurality of mounting holes further comprises two third mounting holes symmetrically arranged on the mounting plate, two opposite ends of the suspending element are threaded to the two third mounting holes respectively, the suspending element is configured to hang the multifunctional lamp mounting box onto the mounting base;

a housing, wherein an upper part of the housing is detachably connected to the mounting plate, wherein the housing is in a shape of a frustum of a cone and defines an opening, the mounting plate is in a same shape with the opening and the mounting plate covers the opening when the housing is connected with the mounting plate; and a lamp holder, detachably mounted in the housing and configured to connect a lamp;

wherein the lamp holder is in a cylindrical shape, the lamp holder is provided with an inner thread and an electrical contact, the inner thread is configured to connect the lamp, and the electrical contact is configured to electrically connect an electrical contact of the lamp; the multifunctional lamp mounting box further comprises a power line, a zero terminal at a first end of the power line is connected to the inner thread, and a live terminal at the first end of the power line is electrically connected to the electrical contact of the lamp holder, and a second end of the power line passes through the first mounting hole to be connected to Mains supply.

2. The multifunctional lamp mounting box according to claim 1, further comprising at least one fixing screw, wherein the housing defines at least one first through hole, the mounting plate is provided with at least one screw hole corresponding to the at least one first through hole, the fixing screw passes through the first through hole to be threaded to the screw hole.

3. The multifunctional lamp mounting box according to claim 1, wherein the hook is provided with a locking screw, the locking screw defines a thread hole, the locking screw can be engaged with the thread hole to define locking space.

4. The multifunctional lamp mounting box according to claim 1, wherein the mounting tube comprises a first fixing nut and a second fixing nut, the first fixing nut is threaded to a lower part of the second thread, and the second fixing nut is threaded to an upper part of the second thread, the first fixing nut resists against a lower surface of the mounting plate, and the second fixing nut resists against an upper surface of the mounting plate.

5. The multifunctional lamp mounting box according to claim 1, wherein the number of the at least one connecting screw is at least two, the number of the at least one second mounting hole is at least two, at least two of the second mounting hole is evenly distributed on the mounting plate.

6. The multifunctional lamp mounting box according to claim 1, wherein the suspending element is an iron chain or a rope.

7. The multifunctional lamp mounting box according to claim 1, further comprising a pull switch, wherein the pull switch is arranged on the housing and extends out of the housing, the pull switch is electrically connected to the power line and configured to switch on/off a circuit of the lamp.

8. The multifunctional lamp mounting box according to claim 7, wherein the lamp holder is in a cylindrical shape, the lamp holder is provided with an inner thread and an electrical contact, the inner thread is configured to connect the lamp, and the electrical contact is configured to electrically connect an electrical contact of the lamp; wherein the plurality of mounting holes comprise the first mounting hole, the multifunctional lamp mounting box further comprises a power line, a zero terminal at a first end of the power line is connected to the inner thread, and a live terminal at the first end of the power line is electrically connected to the electrical contact of the lamp holder, and a second end of the power line passes through the first mounting hole to be connected to Mains supply.

9. The multifunctional lamp mounting box according to claim 7, further comprising at least one fixing screw, wherein the housing defines at least one first through hole, the mounting plate is provided with at least one screw hole corresponding to the at least one first through hole, the fixing screw passes through the first through hole to be threaded to the screw hole.

10. The multifunctional lamp mounting box according to claim 7, wherein the hook is provided with a locking screw, the locking screw defines a thread hole, the locking screw can be engaged with the thread hole to define locking space.

11. The multifunctional lamp mounting box according to claim 7, wherein the mounting tube comprises a first fixing nut and a second fixing nut, the first fixing nut is threaded to a lower part of the second thread, and the second fixing nut is threaded to an upper part of the second thread, the first fixing nut resists against a lower surface of the mounting plate, and the second fixing nut resists against an upper surface of the mounting plate.

12. The multifunctional lamp mounting box according to claim 7, wherein the number of the at least one connecting screw is at least two, the number of the at least one second mounting hole is at least two, at least two of the second mounting hole is evenly distributed on the mounting plate.

13. The multifunctional lamp mounting box according to claim 7, wherein the suspending element is an iron chain or a rope.

14. The multifunctional lamp mounting box according to claim 7, further comprising a pull switch, wherein the pull switch is arranged on the housing and extends out of the housing, the pull switch is electrically connected to the power line and configured to switch on/off a circuit of the lamp.

15. A multifunctional lamp mounting box, comprising:

a mounting plate, defining a plurality of mounting holes;

a connecting module configured to mount the lamp mounting box onto a mounting base, wherein one end of the connecting module is connected to the mounting holes, and another end of the connecting module is connected to the mounting base; wherein the plurality of mounting holes comprises a first mounting hole, wherein the first mounting hole is arranged at a center of the mounting plate, the connecting module comprises at least two of a hook, a mounting tube, at least one connecting screw and a suspending element, wherein the hook is provided with a first thread at a bottom thereof, the first thread is configured to be capable of being threaded to the first mounting hole; the mounting tube is provided with a second thread at a bottom thereof, the second thread configured to be capable of being threaded to the first mounting hole; the plurality of mounting holes comprise at least one second mounting hole, a threaded part of the at least one connecting screw passes through the at least one second mounting hole to connect with the mounting base, and a head of the at least one connecting screw resists against the lower surface of the mounting plate; the mounting hole further comprises two third mounting holes symmetrically arranged on the mounting plate, two opposite ends of the suspending element are threaded to the two third mounting holes respectively, the suspending element is configured to hang the multifunctional lamp mounting box onto the mounting base;

a housing, wherein an upper part of the housing is detachably connected to the mounting plate, the housing is in a shape of a frustum of a cone and defines an opening, the mounting plate is in a same shape with the opening and the mounting plate coves the opening when the housing is connected with the mounting plate; and a lamp holder, detachably mounted in the housing and configured to connect a lamp.

* * * * *